United States Patent [19]

Kutzner et al.

[11] 4,111,122

[45] Sep. 5, 1978

[54] METHOD OF AND APPARATUS FOR THREADING WEB MATERIAL PREFERABLY INTO WEB-FED ROTARY PRINTING PRESSES

[75] Inventors: Willi Albert Peter Kutzner; Georg Schneider, both of Würzburg, Germany

[73] Assignee: Koenig & Bauer Aktiengesellschaft, Würzburg, Germany

[21] Appl. No.: 705,192

[22] Filed: Jul. 14, 1976

[30] Foreign Application Priority Data

Jul. 18, 1975 [DE] Fed. Rep. of Germany ....... 2532168

[51] Int. Cl.[2] ......................... B41F 13/02; G03B 1/56

[52] U.S. Cl. ..................................... 101/228; 101/426; 226/92

[58] Field of Search ............... 101/219, 228, 181, 178, 101/179, 180, 182, 220, 221; 226/92, 91

[56] References Cited

U.S. PATENT DOCUMENTS

| | | | |
|---|---|---|---|
| 2,103,264 | 12/1937 | Lorig | 226/92 |
| 2,862,705 | 12/1958 | Faeber | 226/92 |
| 2,944,345 | 7/1960 | Faeber | 226/92 X |
| 3,127,079 | 3/1964 | Allander | 226/92 |
| 3,587,461 | 6/1971 | Polglase | 101/228 X |
| 3,761,001 | 9/1973 | Bolza-Schunemann | 101/181 X |
| 3,995,553 | 12/1976 | Winterholler et al. | 101/228 |

*Primary Examiner*—J. Reed Fisher

*Attorney, Agent, or Firm*—Jones, Tullar & Cooper

[57] ABSTRACT

A method and apparatus for threading web materials for use in a web-fed rotary printing press is disclosed. A plurality of finite length, flexible conveyors are secured to the press frame, extend between first and second storage devices, and are guided by suitable guides. Drive motors for transporting the conveyors are positioned at either end of the path of web threading and additional drive motors are positioned intermediate the end motors. The web to be transported is secured to the conveyor and suitable ones of the drive motors are actuated to withdraw the conveyor from the first storage device and into the second storage device whereby the web attached thereto is threaded through the assembly. The path of web threading may be varied by connecting various of the conveyors which extend along differing paths through the press.

11 Claims, 6 Drawing Figures

METHOD OF AND APPARATUS FOR THREADING WEB MATERIAL PREFERABLY INTO WEB-FED ROTARY PRINTING PRESSES

FIELD OF THE INVENTION

The present invention is directed generally to a method and apparatus for threading web materials and more particularly to a method and apparatus for threading web materials in web-fed rotary printing presses. Most specifically, the present invention is directed to a method and apparatus for threading web materials in which the web's leading portion is secured to a movable, finite length tape or strand which is, in turn, joined to other similar webs or strands each of which is guided along a specific path through the machine in which the web is to be fed.

The web threading or feeding apparatus of the present invention is comprised generally of a plurality of finite length tapes or strands which extend through the machine on suitable guides. Drive means are provided at the ends and at intermediate portions of the tapes whereby each tape is caused to move in the direction of web feeding during feeding of the web and is then moved in the reverse direction back to a position ready to feed a next web. Suitable junction means are provided along the tapes or strands so that the course of web feed through the machine can be varied as desired by joining together different conveyor tapes or strands. Storage means at the ends of the web feeding path serve as receptacles for the sections of conveyor.

DESCRIPTION OF THE PRIOR ART

Apparatus for threading web material into web-fed rotary printing presses are generally well-known. For instance, infinite length, driven, flexible tapes serve as conveyor means for web material. Also, motor carriages running on rails have been disclosed, (German Patent Application No. 20 21 246). In the German published patent application No. 22 41 127 threading of a paper web into a web-fed rotary printing press is described. In that disclosure, a finite, driven, flexible, metallic threading element is used and it must be guided throughout the press. The necessary guiding means require a certain amount of space and the threading element must travel over relatively large radii of curvature. Moreover, a multiple number of synchronously running driving motors are required, if a long threading element is used, with the number of driving motors depending on the length of the threading element. To change the direction of motion of the threading element, controllable branching-off devices are provided.

SUMMARY OF THE INVENTION

It is an object of the present invention to provide an apparatus for threading web material preferably into web-fed rotary printing presses, in which it is not necessary to guide the finite threading element in fixed, through-passing guiding means, and in which no branching-off devices which raise the price of the apparatus are required.

It is a further object of the present invention to provide a web threading apparatus in which the feeding path of the web through the machine can be varied.

Still another object of the present invention is to provide a web threading apparatus in which the web is guided by a flexible tape or strand to which it is secured.

According to the present invention there is provided a method and apparatus for conveying a flexible web material attached to and guided by a plurality of finite conveyor means fixed to the press frame, in which a finite, flexible conveyor means is pulled from a first storage means by a first pull-off device and is carried by a driving device to a second storage means or device, and is carried back to the first storage device after termination of the threading procedure.

The advantages obtainable due to the invention consist particularly in that the threading of a web material around the smallest radii, through the narrowest gaps and over long paths in an uncomplicated manner is made possible. Thus, mechanical threading of a web becomes possible even with the most difficult material web travels. As the threading apparatus according to the invention requires only a small space, it can be used even if only very small space is available. Furthermore, no mechanical rails are required, only guide rollers or short guide pieces which can be fixed at desired spaced points; therefore, the threading device needs little mounting space or expenditure. In addition, the accessibility of the web-fed rotary printing press is not reduced, when the threading apparatus in accordance with the subject invention is used. The conveyor means of the threading apparatus does not impede access to the press even if it must be moved through narrow rooms entered by attending personnel who have to, for example, mount or to adjust the inking rollers. For this purpose the conveyor means can be removed.

BRIEF DESCRIPTION OF THE DRAWINGS

While the novel features of the present invention are set forth with particularity in the appended claims, a full and complete understanding of the web threading method and apparatus of the present invention may be had by referring to the description of a preferred embodiment as set forth hereinafter and as is seen in the accompanying drawings in which:

DESCRIPTION OF A PREFERRED EMBODIMENT

Figure 1:
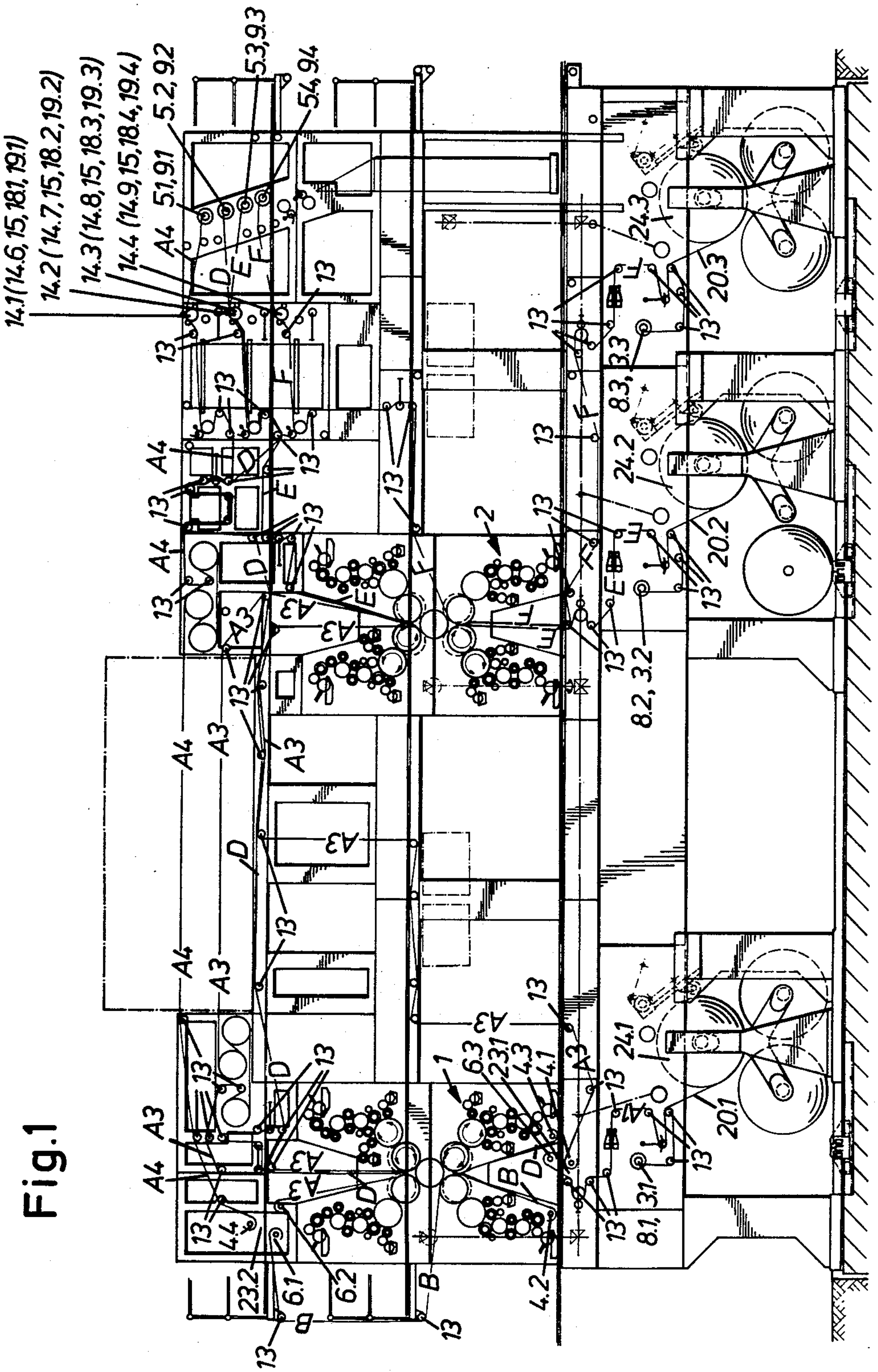
FIG. 1 is a schematic side view of a web-fed rotary printing press in accordance with the present invention and showing various web material threading paths.
Figures 2, 4:
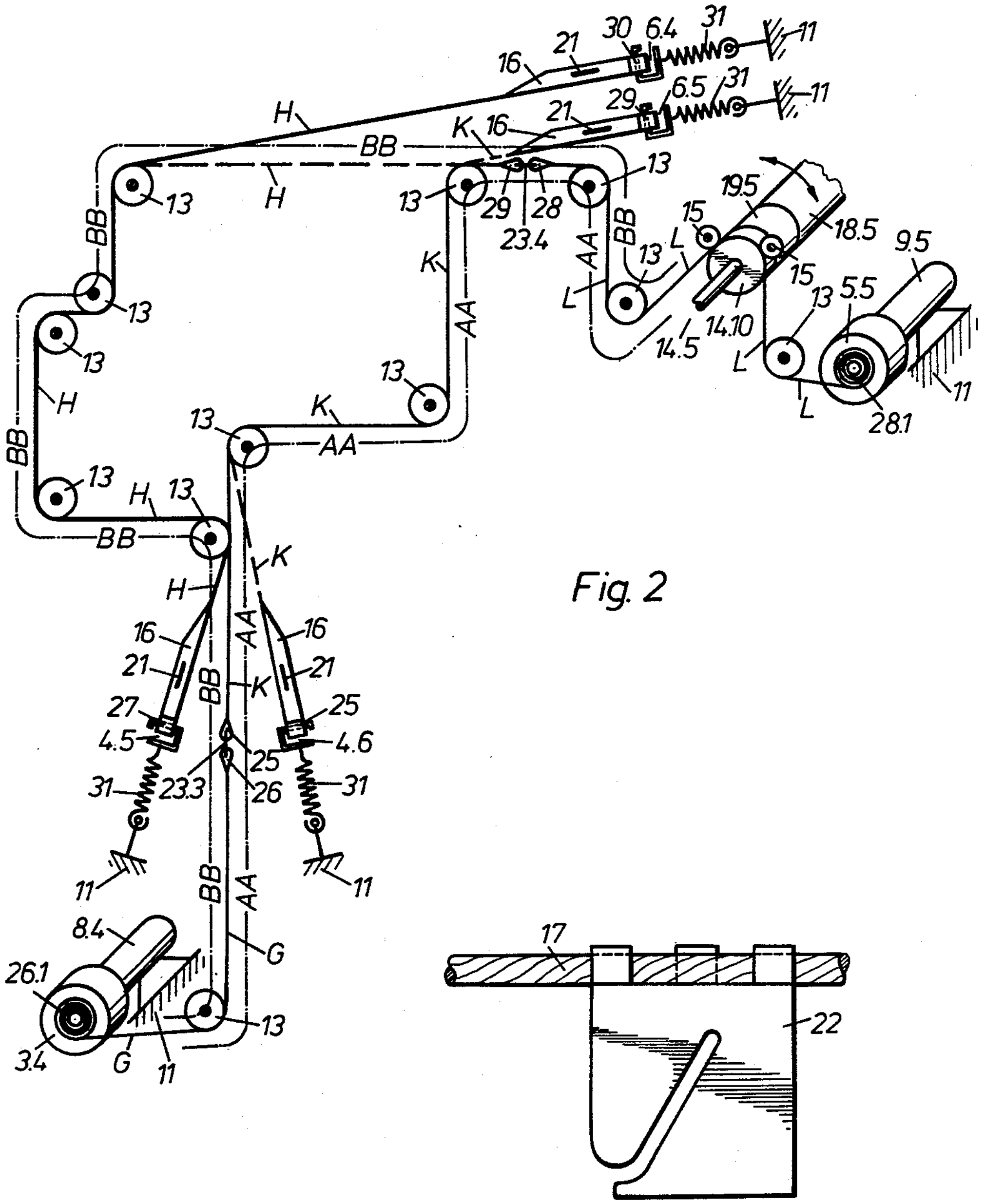
FIG. 2 is a detailed schematic diagram of two web material threading paths and showing the storage devices and the parting positions.
FIG. 4 is a plan view of a rope-shaped conveyor means with a fastening device for web material.

Turning now to FIGS. 1 and 2 it may be seen that the web threading or feeding apparatus in accordance with the present invention operates generally through the use of a number of flexible, finite length tapes or strands which are connectable one to each other to form conveying means for the web of material being fed through the machine. The tapes or strands are stored in or on suitable storage means or devices such as reels and the like and are removed from, or placed on those storage devices in accordance with the direction of web feed. The various individual tapes or strands are connectable one to the other in a plurality of combinations to vary the path along which the web material is fed. Suitable drive means are provided at either end of the conveying means and additional drive means are positioned intermediate the ends.

Figure 3:
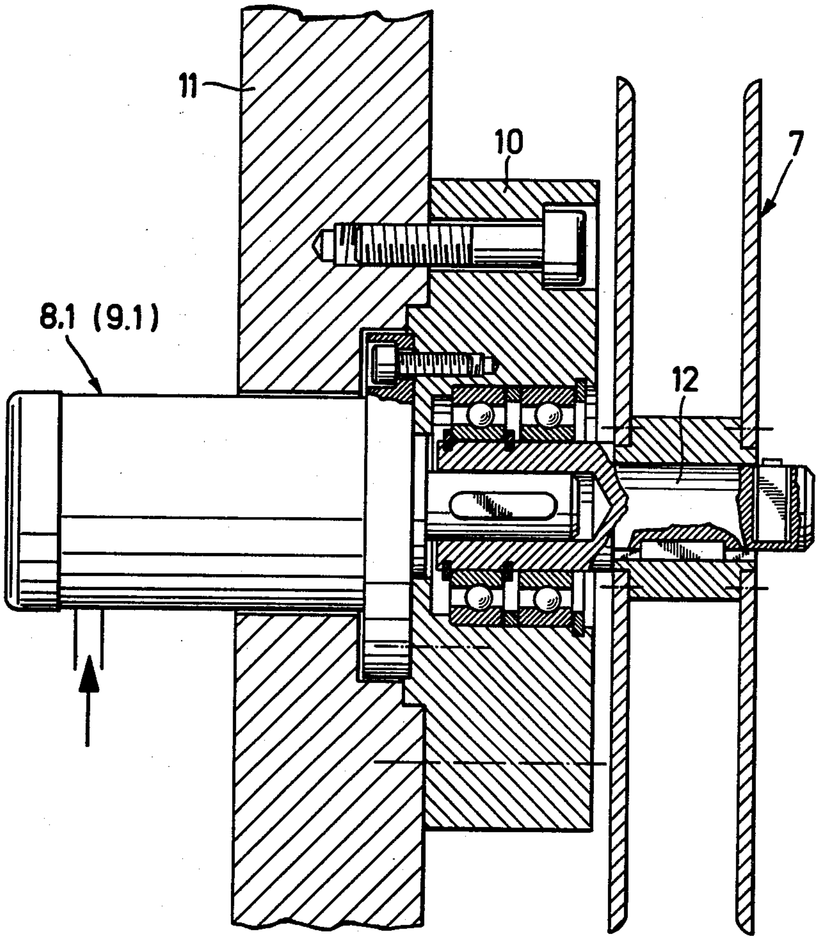
FIG. 3 is a sectional drawing of a reeling or de-reeling device for a conveyor means in accordance with the present invention, mounted in the frame of a web-fed rotary printing press.

As schematically shown in FIGS. 1 and 2, a finite conveyor means A3 moves through the offset printing units 1 and 2. Each conveyor means A1 to A4, or B, C, D, E, F, G, H, K, L begins in a storage device 3.1 to 3.4 or in a fastening device 4.1 to 4.6 respectively and ends in a storage device 5.1 to 5.5 or in a fastening device 6.1 to 6.5, respectively. The storage devices 3.1 to 3.4 and 5.1 to 5.5 may be structured as reels 7, as may be seen in FIG. 3. Other modes of storage may of course be used. The storage devices 3.1 to 3.4, 5.1 to 5.5 are driven by suitable driving means 8.1 to 8.4 and 9.1 to 9.5 as may be seen in FIGS. 1–3. For instance, first drive means 8.1 to 8.4 and second drive means 9.1 to 9.5, used for carrying the conveyor means into the storage devices, may be electric motors, hydraulic motors, or pneumatic motors. These are mounted by means of a flange 10 in the side frames 11 of the web-fed rotary printing press as may be seen in FIG. 3. Advantageously receivers 12 for the reels 7 are designed as so-called quick-change devices, so that the reels are capable of quickly being changed or moved to another place.

In order to control the direction of movement of the conveyor means A1 to A4, B, C, D, E, F, G, H, K, L, a plurality of guide rollers 13 or similar means are provided. These are secured to the side frame 11 and are of approximately 2 cm length.

During the procedure of threading the web material into the press, the drive of the conveyor means A4, D, E, F, L is also accomplished by means of a third or intermediate driving means 14.1 to 14.5, as may be seen in FIG. 1. One or a plurality of pressure rollers 15 as may be seen in FIGS. 1 and 5 press the conveyor means, for example, a flexible, tape-shaped conveyor means 16 as seen in FIG. 2, against the driving roller 14.6 to 14.10 of the intermediate drive means so that its positive conveyance is secured. If a flexible, rope-shaped conveyor means 17 is used, it is possible that one bend onto the driving roller 14.6 to 14.10 suffices for ensuring a positive drive of the rope. Each driving roller 14.6 to 14.10 is synchronously driven with, for example, the feed rollers 18.1 to 18.5, as may be seen in FIG. 2. The driven motion of the driving roller 14.6 to 14.10 can be imparted directly to it by the relative coordinated feed rollers 18.1 to 18.5, or indirectly by a drive 18.6 rotating synchronously with the feed roller 18.1 to 18.5, as shown in FIG. 5, or with the web-fed rotary printing press.

Figure 5:
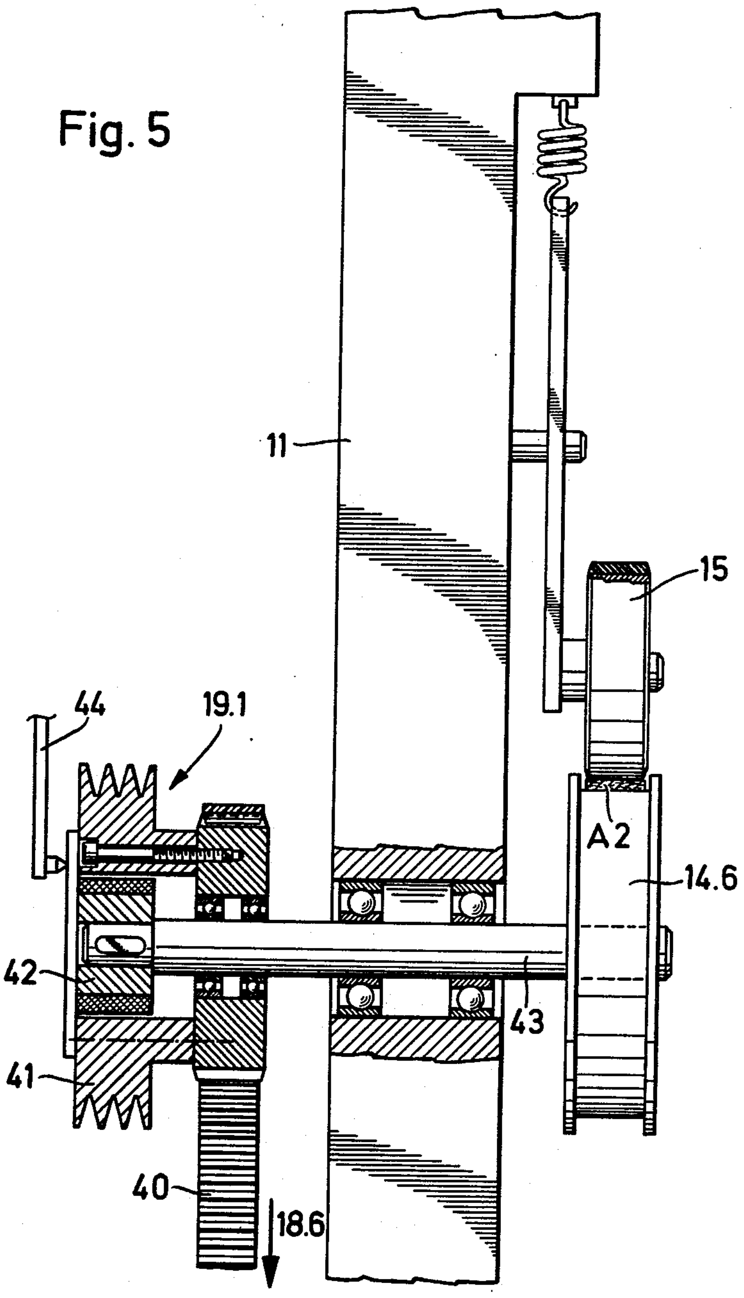
FIG. 5 is a sectional drawing of a preferred embodiment of a driving arrangement for a conveyor means in accordance with the present invention.

Between each driving roller 14.6 to 14.10 and its relative drive such as a feed roller 18.1 to 18.5, a coupling 19.1 to 19.5, as is shown in FIGS. 2 and 5, is inserted. This coupling is capable of being engaged and disengaged, and its driving moment is adjustable. For this useage, electromagnetic couplings are particularly suitable. Because of the insertion of adjustable coupling 19.1 to 19.5, it is possible to preadjust the maximum permissible pull exerted on the web material. Thus, breakage of the material webs 20.1, 20.2, 20.3 or of the conveyor means A1 to A4, B, C, D, E, F, G, H, K, L is avoided since the couplings 19.1 to 19.5 will slip if a jam occurs.

The conveyor means A1 to A4, B, C, D, E, F, G, H, K, L, M are finite, flexible tapes, ropes, chains, or similar material. They may consist of natural fibres, synthetic material, metal, or of combinations of such materials. The tape-shaped conveyor means 16 are, as may be seen in FIG. 2, equipped in the middle of their width, over their whole length, with spaced slots 21 of approximately 100 mm length each. Into these slots 21 the leading end of the material web 20.1 to 20.3 can be introduced and fastened therein. The rope-shaped or chain-shaped conveyor means 17, as may be seen in FIG. 4, carries detachable or fixed material web fastening devices 22. The leading end of the material web is fastened to them. They may consist of plastic material or of metal.

The conveyor means A1 to A4, B, C, D, E, F, G, H, K, L may have one or a plurality of parting positions, or joints 23.1 to 23.4 spaced over the length of the conveyor means. These parting positions 23.1, 23.2, 23.3, 23.4 as are shown in FIGS. 1 and 2 permit parting the conveyor means, such as A1+A3+A4 at these parting positions or joints into conveyor means sections A1, A3, A4 to connect these individual sections with the conveyor means of another web material threading travel, such as A1 with B, or A1 with D. The ends of the conveyor which are not coupled with another end of a second conveyor are fastened to fastening devices 4.1 to 4.6, or to storage devices 6.1 to 6.5, which are provided for this purpose, and thus are secured out of the way.

The procedure for threading web material into the press is described with reference to FIGS. 1 and 2 as follows:

The leading end of the material web 20.1, 20.3 and 20.3 on a supply reel 24.1, 24.2, 24.3 is tapered to form a tip capable of being fastened in one of the slots 21 of the tape-shaped conveyor means 16 or in a material web fastening device 22 of the rope-shaped conveyor means 17. In this phase of operation the conveyor means and the printing press do not operate. By means of convenient electric switching which initiates the threading command, the desired ones of the couplings 19.1 to 19.5 are activated, so that there is a through-drive from the feed roller 18.1 to 18.5 to the driving roller 14.6 to 14.10 of the intermediate drive means 14.1 to 14.5 of the conveyor means A4, D, E, F, L as seen in the upper right portion of FIGS. 1 and 2, it being remembered that the couplings 19.1 to 19.4 are adjustable.

The first driving means 8.1 to 8.4 at the leading end and the second driving means 9.1 to 9.5 at the rear end of the coupled conveyor means A1+A3+A4, G+K+L, of each of the connected material web threading paths such as AA, are maintained with a bias opposite to each other while at rest so that the preselected conveyor means A1+A3+A4, G+K+L, is maintained taut. When the web-fed rotary printing press is started and runs at the speed reqired for the threading operation, the feed rollers 18.1 to 18.5 also rotate. If the coordinated couplings 19.1 to 19.5 are coupled, the driving rollers 14.6 to 14.10 of the intermediate drive means 14.1 to 14.5, with the aid of the pressure rollers 15, so that the conveyor means A1+A3-+A4 are driving in a slip-free manner. In this phase of operation, the first driving means 8.1 to 8.4 coupled with the supplying storage device 3.1 to 3.4 does not exert any moment on the conveyor means A1+A3-+A4, G+K+L, whereas however the second driving means 9.1 to 9.5 coupled with the receiving storage device 5.1 to 5.5 is operated so as to drive the storage device, which is a reel 7. Thus the conveyor means A1+A3+A4, G+K+L, which is driven synchronously with the feed roll 18.1 to 18.5, is wound up on a reel 7 of storage device 5.1 to 5.5. By the motion of the conveyor A1+A3+A4, G+K+L, along the preselected material web path such as AA in FIG. 2, the material web fixed on it, for example, 20.1, is conveyed along a predetermined path through the press. As soon as the top of the material web has reached the desired position in the press, it is removed from the slot 21 of the now stopped conveyor means A1+A3+A4, G+K+L and is guided by hand for example over the formers of a folding apparatus. When the leading end of the material web has been introduced into the folder unit, the procedure of threading the material web into the press is complete.

After every completed threading procedure, the conveyor means is re-reeled, so that the required length of the conveyor means is available for another threading procedure. By way of example, the re-reeling procedure can automatically be initiated simultaneously with the first command "faster" accelerating the press speed. This would mean for the described example that the coupling 19.1 to 19.5 is deactuated and that the drive for the driving roller 14.6 to 14.10 of the conveyor means A1+A3+A4, G+K+L is stopped. At the same time, the first driving means 8.1, 8.4 will drive the storage device 3.1, 3.4 so that the conveyor means A1+A3+A4, G+K+L is re-reeled.

After termination of the re-reeling procedure the first and second driving means 8.1 to 8.4 and 9.1 to 9.5 are maintained with a bias opposite to each other while at rest so that the conveyor means A1+A3+A4, G+K+L are maintained continuously taut.

For the termination of the reeling or re-reeling procedure, induction switches can be used which may be, for example, actuated by a metallic portion of the conveyor means. It is also possible to use disconnecting devices which release an appropriate control command occasioned by the decreasing or increasing reel radius of the reeled conveyor means. Any number of alternate means may be employed to automatically stop the drive means upon completion of web feed.

FIG. 2 shows two different material web paths AA and BB capable of being realized by means of the conveyor means G, H, K, L. The conveyor means G, H, K, L are guided by the guide rollers 13. The conveyor means G is connected with the first storage device 3.4, and the conveyor means L with the second storage device 5.5. The storage devices 3.4 and 5.5 are drivably connected with the first and second driving means 8.4 and 9.5, respectively, which are capable of being connected and disconnected as has been discussed previously. The driving means 8.4 and 9.5 are fixed to the side frames 11 of the web-fed rotary printing press. By way of example, the feed roller 18.5 rotating synchronously with the number of revolutions of the press, serves as a drive for the driving roller 14.10 of the intermediate drive means 14.5 located in the side frames 11 of the web-fed rotary printing press. A coupling 19.5 is interpositioned between the feed roller 18.5 and the driving roller 14.10 and is capable of being connected and disconnected. Pressure rollers 15 press the tape-shaped conveyor means L against the driving roller 14.10. By way of example, suppose that the material web is to be threaded along the material web path AA. To accomplish this, the leading end 25 of the conveyor means K must be fastened to the rear end 26 of the conveyor means G. The leading end 27 of the conveyor means H which is set free, is, by way of example, fastened in a depositing device such as fastening device 4.5. The rear end 28 of the conveyor means L is then connected with the rear end 29 of the conveyor means K. The rear end 30 of the conveyor means H is fastened, similarly to its leading end 27, in a depositing device such as fastening device 6.4. Fastening device 4.6 is provided for the leading end 25 of the conveyor means K, and a fastening device 6.5 is provided for the rear end 29 of the conveyor means K. The depositing devices, fastening devices 4.5, 4.6, 6.4, 6.5, are fixed at the side frames 11 of the printing press and provide for maintaining the disengaged conveyor means taut. For this purpose, elements which exert a tensile force, such as tension springs 31, can be fastened at the leading ends or rear ends, respectively of the conveyor means which temporarily are not being used, to tighten this conveyor means. The leading ends of the conveyor means G, and the rear end of conveyor means L, are fixed in the coordinated storage devices, 3.4 and 5.5.

For joining the tape-shaped conveyor means 16, different means can be used. By way of example snap fasteners known from the textile industry can be used. It would, however, also be possible to form the leading ends and the rear ends of the tape-shaped conveyor means as loops, and to connect these loops by means of appropriate connecting means.

In FIG. 5 there is shown an example of how an independent drive 18.6 of a conveyor means A2 may be structured. As may be seen, a driving roller 14.6 cooperates with a pressure roller 15, with driving roller 14.6 being driven from a drive 18.6 rotating synchronously with the press by means of a toothed belt 40 which transfers a rotational motion onto the outer stator 41 of a coupling such as an electromagnetic coupling. According to whether the winding of the inner stator 42 is exited or not, a rotational motion is transferred by means of the inner stator 42 by the shaft 43 onto the driving roller 14.6 and thus onto the conveyor means A2. It goes without saying that instead of the belt drive, other types of drives may be used. The electric energy supply which is controlled, is provided by means of the electrical connection shown schematically at 44.

Figure 6:
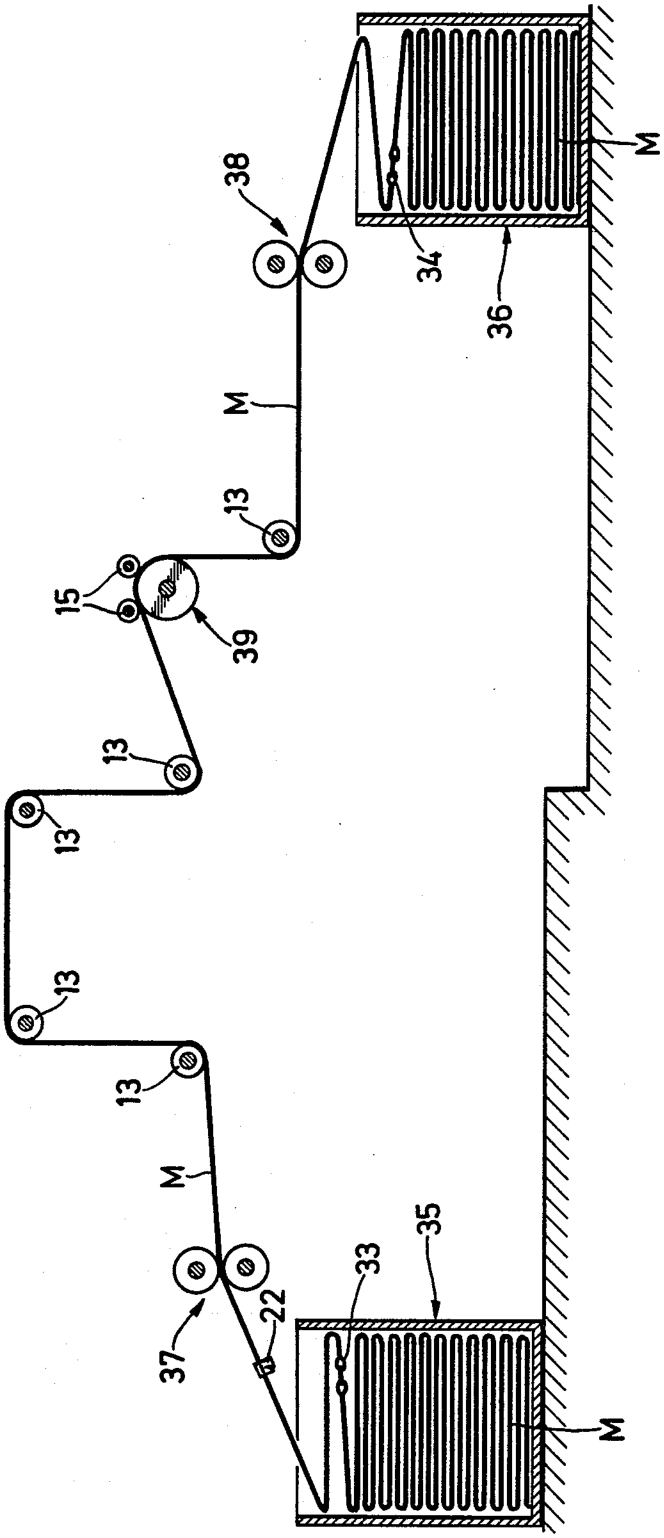
FIG. 6 is a schematic drawing of a second preferred embodiment of a threading device in accordance with the present invention.

Another embodiment of the invention is shown in the schematic drawing of FIG. 6. A finite, tape-shaped, chain-shaped, or rope-shaped conveyor means M, which is guided by rollers 13, is provided with fastening devices for the leading end of a material web. Conveyor means M has its leading end 33 and its rear end 34 retained in storage devices 35 and 36 respectively, which are not reel-shaped. Near the storage devices 35, 36, auxiliary driving devices 37, 38 for the conveyor means M are disposed. They may consist of a conveyor roller driven by a hydraulic motor, a pneumatic motor, a rotary motor, or a linear motor and one or a plurality of pressure rollers cooperating with the conveyor roller.

Between the driving devices 37 and 38, a main, intermediate driving means 39 for the conveyor means M can be positioned. It may consist of a driven feed roller, an engageable and disengageable adjustable coupling, a driving roller, and pressure rollers. The object and the mode of operation of the auxiliary driving devices 37 and 38 are similar to those of the driving means 8.1 to 8.4, and 9.1 to 9.5. The object and the mode of operation of the individual elements of the main intermediate driving means 39 correspond to those of the driving roller 14.6 to 14.10, of the feed roller 18.1 to 18.5, of the coupling 19.1 to 19.5, and of the pressure rollers 15 according to the example described above. The explanations given in the first embodiment as to conveyor means, fastening device, parting positions and principal modes of function, apply of course also to this second embodiment.

While preferred embodiments of a method and apparatus for threading web materials through a web-fed rotary printing press have been hereinabove fully and completely described, it will be obvious to one of ordinary skill in the art that a number of changes in, for example, the material and for the conveyors, the type of drive motors used, the shape of the guide means, the type of couplings between the conveyors, and the like could be made without departing from the spirit of the invention and that the scope of invention is to be determined by the appended claims.

We claim:

1. Apparatus for threading web material along a selected one of a plurality of paths of web feed through a web-fed rotary printing press comprising:

a finite length, flexible conveyor means, said conveyor means including first and second conveyor sections and at least one intermediate conveyor, said intermediate conveyor being one of a plurality of intermediate conveyor sections, each of said intermediate conveyor sections extending through the press along one of said paths of web feed, each said intermediate conveyor section having means for fastening the web to be threaded, and each said conveyor section further having joints for selectively connecting conveyor sections to each other;

first and second storage means for said first and second conveyor sections, respectively, said first and second storage means being positioned at the start and end of the paths of web threading; and, first and second drive means cooperating with said first and second storage means to move said conveyor means between said storage means whereby the web secured to said conveyor means is threaded through the press along the selected path of web feed defined by the intermediate conveyor section selected and joined to said first and second conveyor sections.

2. The apparatus of claim 1 wherein a third driving means for said conveying means engages said conveying means between said first and second drive means.

3. The apparatus of claim 2 wherein said third driving means is driven by a feed roller of the rotary press and includes a driving roller which engages said conveyor means.

4. The apparatus of claim 3 wherein at least one pressure roller is coordinated with said driving roller.

5. The apparatus of claim 4 wherein a coupling is positioned between said driving roller and the feed roller which drives it.

6. The apparatus of claim 5 wherein said coupling is variable.

7. The apparatus of claim 1 wherein all of said plurality of intermediate conveyor sections other than the one joined to said first and second conveyor sections are retained in place by tensioning means.

8. The apparatus of claim 1 wherein each of said storage means is a reel.

9. The apparatus of claim 1 wherein said conveyor means is guided along the path of web threading by a plurality of guide means.

10. The apparatus of claim 9 wherein said guide means are rollers attached to the press frame.

11. A method for threading a web along a selected one of a plurality of paths of web feed through a web-fed rotary printing press comprising:

positioning a finite length flexible conveyor means on the press, said conveyor means including first and second conveyor sections and at least one intermediate conveyor, said intermediate conveyor being one of a plurality of intermediate conveyor sections, each of said intermediate conveyor sections extending through the press along one of said paths of web feed, each said conveyor section further having joints for selectively connecting conveyor sections to each other;

securing the ends of said conveyor means to first and second storage means;

connecting first and second drive means to said first and second storage means;

securing a web of material to be threaded to said conveying means; and activating said drive means between the first and second storage means whereby said conveyor means is moved from an initial position out of said first storage means along a selected one of said paths of web threading to said second storage means to carry the web along the selected path of web feed defined by the intermediate conveyor section selected and joined to said first and second conveyor sections, and further wherein said drive means are reversed to return said conveyor means to said initial position.

* * * * *